Dec. 2, 1958  H. J. STRAUSS  2,862,986
STORAGE BATTERY
Filed Oct. 6, 1954
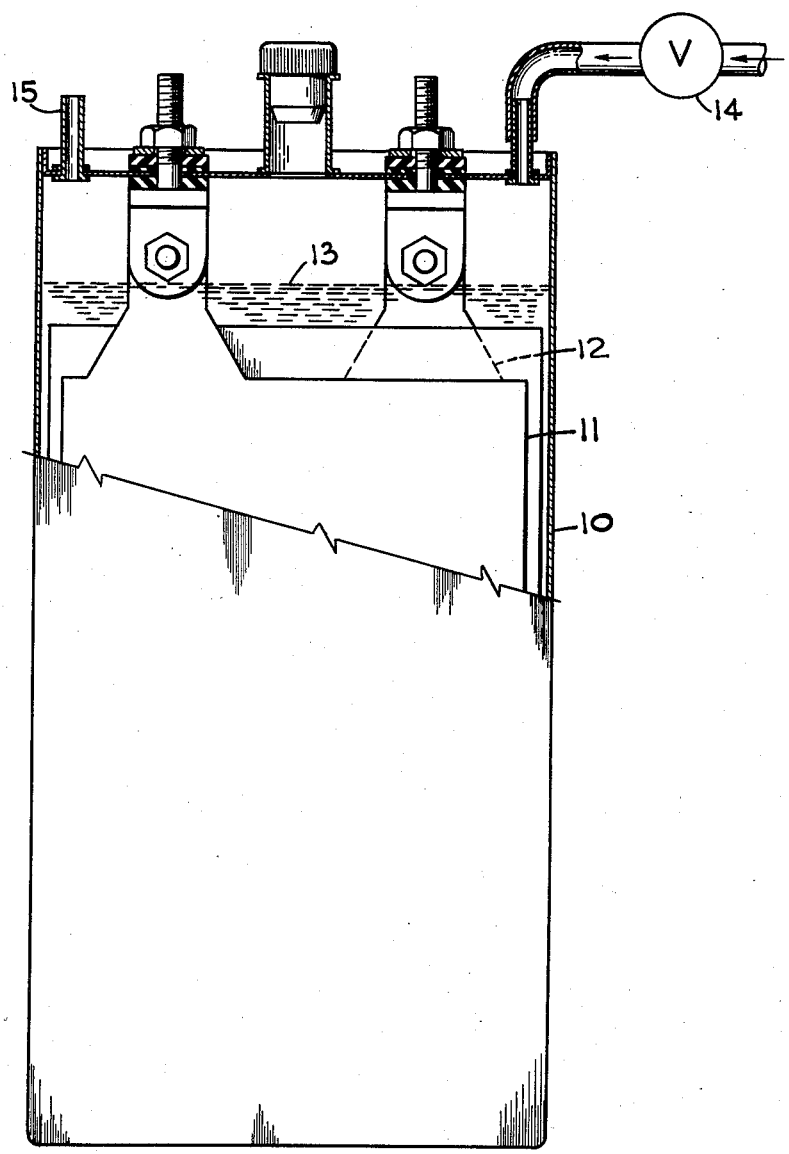
INVENTOR
HOWARD J. STRAUSS
BY
ATTORNEY Patented Dec. 2, 1958

2,862,986

STORAGE BATTERY

Howard J. Strauss, Elkins Park, Pa., assignor to The Electric Storage Battery Company, a corporation of New Jersey Application October 6, 1954, Serial No. 460,679

1 Claim. (Cl. 136—34)

The invention relates to storage batteries of the hermetically sealed type and has for an object the provision of a hermetically sealed sealed battery in which there is maintained a preferential chemical reaction which maintains a lower gas pressure within the battery than other chemical reactions which would occur in the absence of such preferential reaction.

Heretofore it has been proposed hermetically to seal batteries, particularly of the alkaline type, and various suggestions have been made as to how to limit the maximum pressure which may be produced. For example, it has been proposed to provide pressure-responsive switches for limiting the degree of charging of the battery; to provide negative electrode capacity substantially in excess of that of the positive; and to provide structures favoring gas diffusion within the electrolyte.

In accordance with the present invention conditions are established within the battery which favor a chemical reaction in which one of the evolved gases, oxygen, combines with water thus to reduce the volume of the gas within the battery. The manner in which the favorable conditions are established, and further objects and advantages of the invention, will be set forth in the following description taken in conjunction with the accompanying drawings, in which:

The figure diagrammatically illustrates one method of practicing the invention in a battery made in accordance with the invention and appearing in sectional view.

Once the principles of the invention have been understood, it will be seen that the invention may be applied to batteries of many types. For ease in understanding the invention, however, it has been shown in the drawings as applied to a battery 10 including positive electrodes or plates 11 formed of nickel hydroxide and negative plates or electrodes 12 formed of cadmium, the plates being immersed in an alkaline electrolyte 13, such as potassium hydroxide.

If the battery 10 is connected to a charging circuit, it is well understood that the following charging reaction will take place at the positive plate:

$$Ni(OH)_2 + OH^- \rightarrow Ni(OH)_3 + 1 \text{ electron} \quad (1)$$

The foregoing equation shows that nickelous hydroxide is converted to nickelic hydroxide. This reaction is the only reaction that will occur if the charging procedure takes place at 100% efficiency, a condition not usually encountered in practice and which requires the passage of a charging current of a low order. With high rate charging, or as the battery attains full charge, a second reaction can occur at the positive plate which is as follows:

$$4OH^- \rightarrow 2H_2O + O_2 + 4 \text{ electrons} \quad (2)$$

Under these latter conditions the reactions of Equations 1 and 2 may concurrently occur. Thus, it will be seen that oxygen will be released during the charging cycle and the evolution of that gas will tend to increase the pressure within the sealed battery 10.

For reasons which will be later explained in detail, the cell is initially purged by oxygen which, under the control of a valve 14, may flow from a source of supply through the air space within the cell, a sealing device 15, here shown to be a crimpable tube, provided through which the oxygen may exit from the cell until completion of the purging operation, after which the cell will be sealed by crimping the inlet and outlet tubes, or by any other suitable means.

In this connection the electrolyte, such as potassium hydroxide, may be initially treated for maximum absorption of oxygen therein and for removal therefrom of other gases. For this purpose, the inlet tube may be extended to the bottom of the cell permitting the oxygen to rise through the body of electrolyte. Thus, when sealed the battery 10 will have in the gas space above the electrolyte an atmosphere of oxygen with a minimum of other gases present in that atmosphere and in the electrolyte. The negative electrode has, in terms of amount of electrochemically active material, an excess over the amount of electrochemically active material of the positive plates.

The charging reaction at the negative electrode which ordinarily takes place is as follows:

$$Cd(OH)_2 + 2 \text{ electrons} \rightarrow Cd + 2OH^- \quad (3)$$

As long as the charging current does not exceed a rate to produce 100% effiiciency, the reaction of Equation 3 occurs and no evolution of gas is present. However, with other than 100% efficiency, and in the absence of the present invention it is possible for the following gas producing reaction to occur at the negative electrodes:

$$2H_2O + 2 \text{ electrons} \rightarrow H_2 + 2OH^- \quad (4)$$

It is the reaction of Equation 4, the hydrogen producing reaction, that is avoided in accordance with the present invention. Evolution of hydrogen gas would rapidly increase the gas pressure within the battery notwithstanding the fact that other reactions also occur within the battery under conditions of overcharge. First considering the reaction at the negative plates:

$$O_2 + H_2O + 4 \text{ electrons} \rightarrow 4OH^- \quad (5)$$

The gas-removing reaction of Equation 5 occurs as oxygen is diffused through the electrolyte to the face of the electrodes 12. The solubility of oxygen in the electrolyte, being higher than that of hydrogen, tends to minimize build-up of gas pressure within the battery.

The gas-removing overcharge reaction which in the absence of the present invention could occur at the face of the positive plates is as follows:

$$H_2 + 2OH^- \rightarrow 2H_2O + 2 \text{ electrons} \quad (6)$$

Because of the low solubility of hydrogen in the electrolyte, however, the reaction of Equation 6 tends to occur rather slowly and does not offset the reaction of Equation 4. With both present there will be a resultant rapid rise of internal pressure within the battery 10. However, the conditions already described avoid the reaction of Equation 4 and favor occurrence of the reaction of Equation 5.

Further in accordance with the invention, advantage is taken of the fact that the electrode potential required for the reaction of Equation 5 varies with the partial pressure of oxygen above the level of electrolyte 13 in battery 10. As the partial pressure of oxygen increases, the potential required at the negative electrode for the reaction of Equation 5 decreases. Accordingly, by utilizing an initially oxygen-saturated electrolyte and by providing an oxygen atmosphere within the sealed battery 10, the partial pressure of hydrogen within the cell is reduced to an exceedingly low value, approaching zero as a limit. The gas pressure within the cell is equal to the partial pressure of oxygen since there have been eliminated the partial pressures due to gases other than oxygen (principally nitrogen for air) which would make up the total gas pressure of the battery. Accordingly, there is established within the battery conditions providing maximum solubility of oxygen within the electrolyte for a given total gas pressure within the cell. That solubility increases with increasing partial pressure of oxygen above the electrolyte and is maximum for any given total gas pressure within the cell where the total pressure is equal to the partial pressure of oxygen.

In establishing the conditions of high solubility of oxygen in the electrolyte, the minimum electrode potential required for the initiation of the reaction of Equation 5 is reduced to a value materially lower than the electrode potential required for the undesired reaction of Equation 4 which produces the evolution of hydrogen.

As further assurance that conditions will always favor the reaction of Equation 2 in preference to the reaction of Equation 4 there is provided an excess of negative material relative to the positive material. This provision assures that the positive plates will first become fully charged. Accordingly, the reaction of Equation 2 for the overcharge condition of the positive plates will first occur with safeguards established minimizing the likelihood of the occurrence of the reaction of Equation 4. The amount by which the negative material, electrochemically speaking, must exceed that of the positive material depends upon the volume of the gas space above the level of electrolyte. The larger the gas space, the greater must be the excess of the negative material over that of the positive. Accordingly, by making the gas space quite small, the negative excess may be made small, approaching zero as a limit. Thus there arise advantages in making the gas space small, both from the standpoint of battery size and from the standpoint of a minimum excess of negative material over that of the positive material.

While temperature is an important factor in the operation of hermetically sealed batteries, and while it is well understood that the internal pressure of the battery will rise with rise in temperature, the oxygen nevertheless has higher solubility in the electrolyte than hydrogen for any given pressure or temperature, the solubility of oxygen in aqueous liquids being considerably greater than that of hydrogen. Thus a battery in accordance with the present invention may be operated under conditions of higher ambient temperature than batteries in which there is present a substantial amount of hydrogen. A factor contributing to this desirable result is the fact that the total pressure within the battery is due to the oxygen and under normal temperature conditions—say, room temperature at 70° F.—the total gas pressure due solely to the oxygen may be less than atmospheric pressure; it may be as low or lower than a fifth of the atmospheric pressure, the important consideration being that the partial pressure of oxygen within the cell shall be high as compared with the partial pressures of other gases within the cell.

What is claimed is:

The method of minimizing gas pressures within a gastight battery cell of the nickel-cadmium alkaline type, which comprises placing in a container an alkaline electrolyte together with a positive nickel electrode and a negative cadmium electrode having an excess of negative material as compared with the positive material, introducing oxygen into the container prior to sealing the same to increase the partial pressure of oxygen within the container to a value approaching as a limit the total gas pressure within the container, hermetically closing the container with an oxygen atmosphere above the electrolyte therein, and applying charging current to said cell.

References Cited in the file of this patent

UNITED STATES PATENTS

| | | |
|---|---|---|
| 441,843 | Hoy | Dec. 2, 1890 |
| 913,390 | Jungner | Feb. 23, 1906 |
| 2,104,973 | Dassler | Jan. 11, 1938 |
| 2,578,027 | Tichenor | Dec. 11, 1951 |
| 2,651,669 | Neumann | Sept. 8, 1953 |

FOREIGN PATENTS

| | | |
|---|---|---|
| 308,996 | Germany | Nov. 6, 1918 |
| 241,086 | Switzerland | June 17, 1946 |